(12) United States Patent
Hauser et al.

(10) Patent No.: US 11,015,966 B2
(45) Date of Patent: May 25, 2021

(54) DOSING DEVICE

(71) Applicant: FLSmidth A/S, Valby (DK)

(72) Inventors: Armin Hauser, Schwabmünchen (DE); Daniel Kasperek, Mering (DE)

(73) Assignee: FLSmidth A/S (DK)

( * ) Notice: Subject to any disclaimer, the term of this patent is extended or adjusted under 35 U.S.C. 154(b) by 0 days.

(21) Appl. No.: 16/634,329

(22) PCT Filed: Jul. 5, 2018

(86) PCT No.: PCT/EP2018/068216
§ 371 (c)(1),
(2) Date: Jan. 27, 2020

(87) PCT Pub. No.: WO2019/020339
PCT Pub. Date: Jan. 31, 2019

(65) Prior Publication Data
US 2020/0173832 A1 Jun. 4, 2020

(30) Foreign Application Priority Data

Jul. 27, 2017 (DK) .......................... PA 2017 70594

(51) Int. Cl.
*G01F 11/24* (2006.01)
*G01G 13/02* (2006.01)

(52) U.S. Cl.
CPC ........... *G01F 11/24* (2013.01); *G01G 13/026* (2013.01)

(58) Field of Classification Search
CPC ............................... G01F 11/24; G01G 13/24
USPC ....... 222/410, 414, 264, 267, 268, 271, 293, 222/294, 311, 312, 315, 317, 367, 370
See application file for complete search history.

(56) References Cited

U.S. PATENT DOCUMENTS

| | | |
|---|---|---|
| 2,636,478 A | 4/1953 | Smyser |
| 4,528,848 A | 7/1985 | Haefner |
| 4,661,024 A | 4/1987 | Haefner |
| 5,997,220 A * | 12/1999 | Wormser ........... B65G 53/4616 222/367 |
| 6,241,499 B1 | 6/2001 | Stigebrandt |

(Continued)

FOREIGN PATENT DOCUMENTS

CH      491030 A      5/1970

OTHER PUBLICATIONS

The International Search Report and Written Opinion dated Oct. 9, 2018, 15 pages.

*Primary Examiner* — Lien M Ngo
(74) *Attorney, Agent, or Firm* — Jeffrey A. Sharp

(57) ABSTRACT

A dosing device for the continuous, gravimetric dosing of pourable material particularly rough fuels, wherein a flow of material Is conveyed from a charging opening to an emptying opening in a housing with a rotor which is driven about a vertical rotation axis, while determining the instantaneous load over a measuring section, and with a force measuring device which detects the instantaneous toad of the flow of material guided via the rotor comprising a plurality of ribs and a peripheral ring said ribs being attached to the peripheral ring, and said ribs defining a number of chambers inside the peripheral ring for carrying material during operation wherein an elastic peripheral sealing lip is arranged on the peripheral ring and engaging an upper housing wall such that an outer peripheral volume of the inside of the housing is sealed from a central volume of the housing.

9 Claims, 7 Drawing Sheets

(56) References Cited

U.S. PATENT DOCUMENTS

Figure 1:
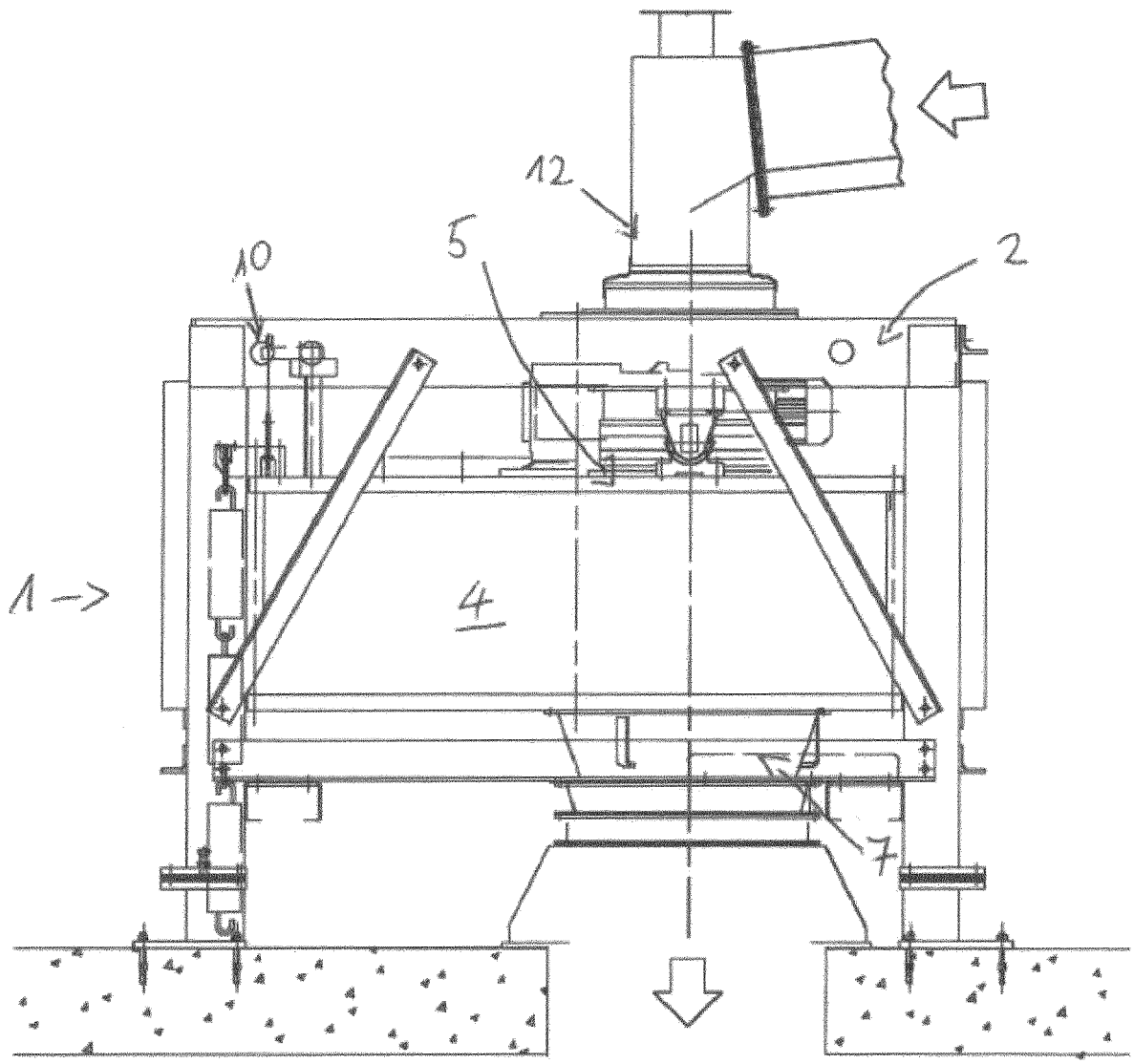

| | | | | |
|---|---|---|---|---|
| 6,254,366 B1 * | 7/2001 | Walton | ................... | F01C 19/10 |
| | | | | 277/357 |
| 7,597,219 B2 * | 10/2009 | O'Leary | ............ | B65G 53/4633 |
| | | | | 222/349 |
| 2004/0234917 A1 | 11/2004 | Haefner | | |

* cited by examiner

DOSING DEVICE

A dosing device for the continuous, gravimetric dosing of pourable material particularly raw meal for cement production, wherein a flow of material Is conveyed from a charging opening to an emptying opening in a housing with a rotor which is driven about a vertical rotation axis, while determining the instantaneous load over a measuring section, and with a force measuring device which detects the instantaneous load of the flow of material guided via the rotor comprising a plurality of ribs and a peripheral ring said ribs being attached to the peripheral ring, and said ribs defining a number of chambers inside the peripheral ring for carrying material during operation wherein an elastic peripheral sealing lip is arranged on the peripheral ring and engaging an upper housing wall such that an outer peripheral volume of the inside of the housing is sealed from a central volume of the housing.

DESCRIPTION

The invention relates to a dosing device for the continuous gravimetric dosing of pourable material comprising the pre-characterizing features of claim 1.

Such dosing devices are known e.g. from U.S. Pat. No. 4,528,848 disclosing an apparatus for continuous gravimetric metering of pourable material conveyed through a charging inlet into pockets of a rotor arranged in a housing rotatable about an essentially vertical axis and fed out from the pockets through a discharging outlet arranged offset in respect of the charging inlet in rotational direction of the rotor. The housing is mounted in a frame pivotally about an essentially horizontal axis and depends on the frame via a load cell arranged remote from said axis. Typically, with a known system such raw meal for cement production is supplied to a heat exchanger from a bin in metered large quantities as 30 to 1000 tons per hour. For such purpose the material is guided through a conveyor trough onto a belt-type metering device. The conveyor trough is arranged in an inclined position and is provided with a porous bottom permitting air being finely distributed from a pressurized air space: into the material conveyed on the conveyor trough. However, such a system operates as an open system which requires considerable measures as covers and enclosures in order to comply with environmental regulations.

It is an object of the invention to provide an improved dosing device of the above-mentioned type.

This object is achieved by a dosing device according to the features of claim 1.

A safe, wear resistant and blocking free feeding is achieved by arranging an elastic sealing lip on the peripheral ring and engaging an upper housing wall. Besides, the lip can be arranged such that the latter increases sealing pressure as a consequence of pressure from material inside the rotor.

Furthermore, the lip may be arranged on the peripheral ring in an angle from the outer ring and towards the central part of the rotor such that material inside the rotor during operation applies a sealing pressure to the lip by pressing the lip against the upper housing wall above the rotor. By directing the angle of the lip inwards towards the centre of the dosing device, the pressure exercised on the lip by the flowing material inside the dosing device will improve the sealing as a function of increased pressure inside the device, since the material will push the lip towards the upper housing wall thereby increasing the sealing effect.

The lip may advantageously comprise an L-shaped cross-section, since the angle towards the centre can then readily be achieved by the profile of the lip, when mounted directly on a vertical surface of the peripheral ring.

To increase capacity of the dosing device further at least one rib sealing lip may be arranged on one or more of the ribs for preventing material from flowing past the ribs between neighbouring spaces and allowing complete filling of the spaces without spilling into adjacent.

Also at least one additional rib sealing lip may be arranged on one or more of the ribs such that both a rib sealing lip and an additional rib sealing lip is arranged on one or more ribs in a double lib configuration.

The object of the invention is also achieved by a dosing device for the continuous, gravimetric dosing of pourable material particularly raw meal for cement production, wherein a flow of material can be conveyed from a charging opening to an emptying opening in a housing with a rotor which is driven about a vertical rotation axis, while determining the instantaneous load over a measuring section, and with a force measuring device which can detect the instantaneous load of the flow of material guided via the rotor comprising a plurality of ribs, the ribs defining a number of chambers for carrying material during operation characterized in that at least one rib sealing lip can be arranged on one or more of the ribs for preventing material from flowing past the ribs between neighbouring chambers.

The at least one rib sealing lip can be arranged on the rib in an angle from the rib and opposite the direction of rotation of the rotor. The at least one rib sealing lip can have an L-shaped cross-section and/or can be elastic. In some embodiments, there can be at least one additional rib sealing lip arranged on one or more of the ribs (for preventing material from flowing past the ribs between neighbouring chambers. In some embodiments, the at least one additional rib sealing lip can be arranged on the rib in an angle from the rib and opposite the direction of rotation of the rotor.

Figure 2:
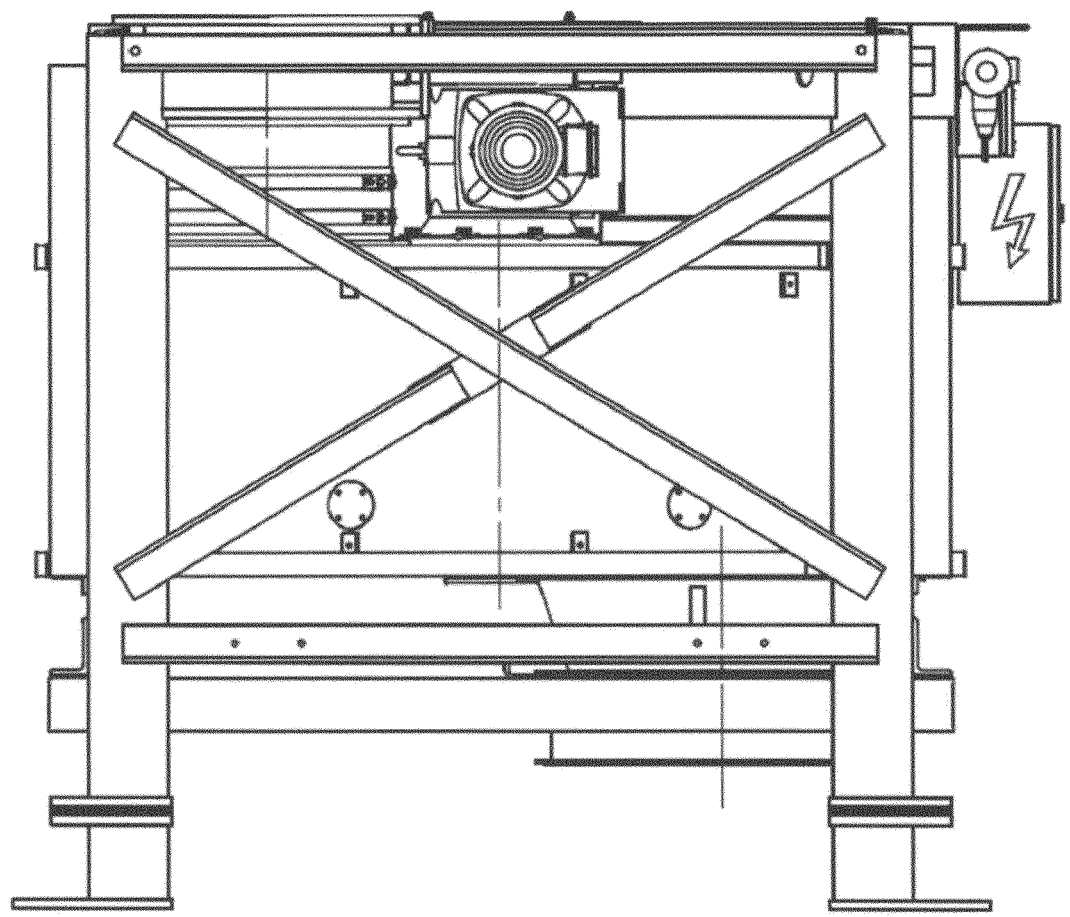
Figure 3:
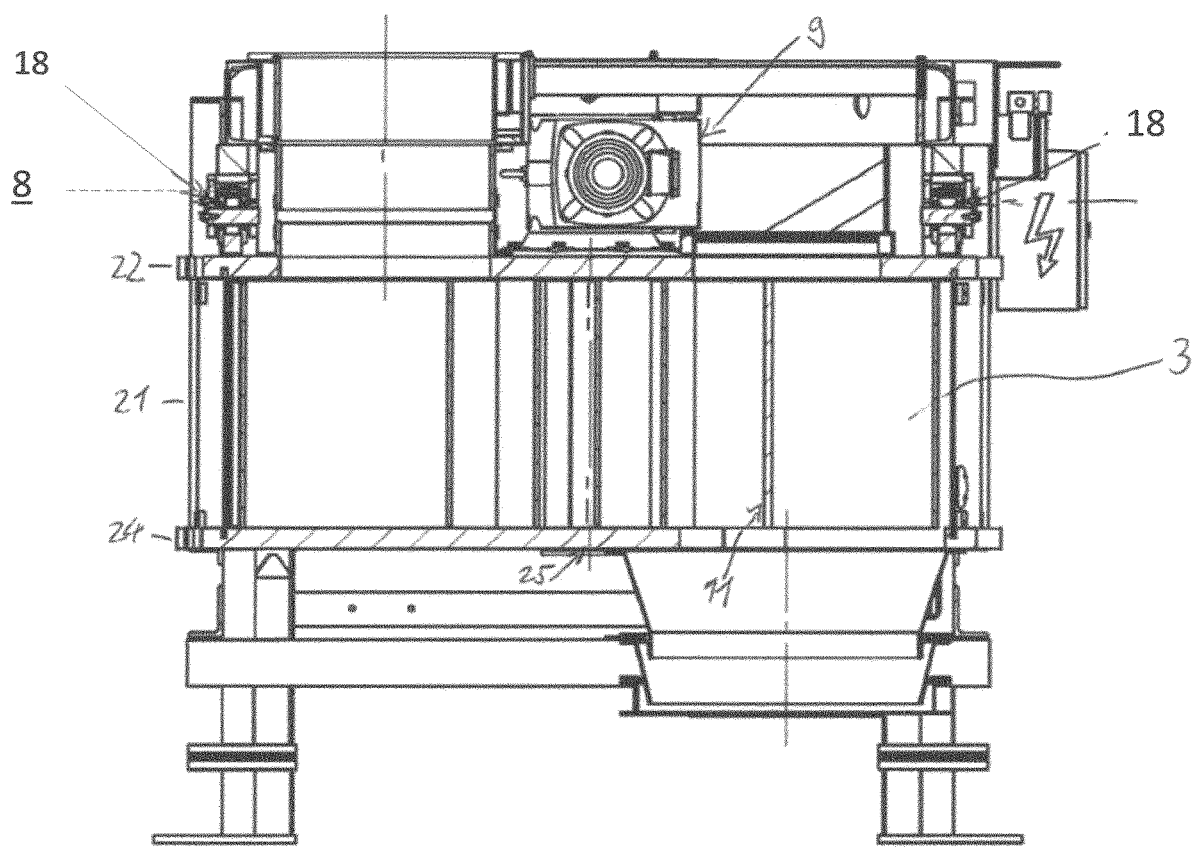
Figure 4:
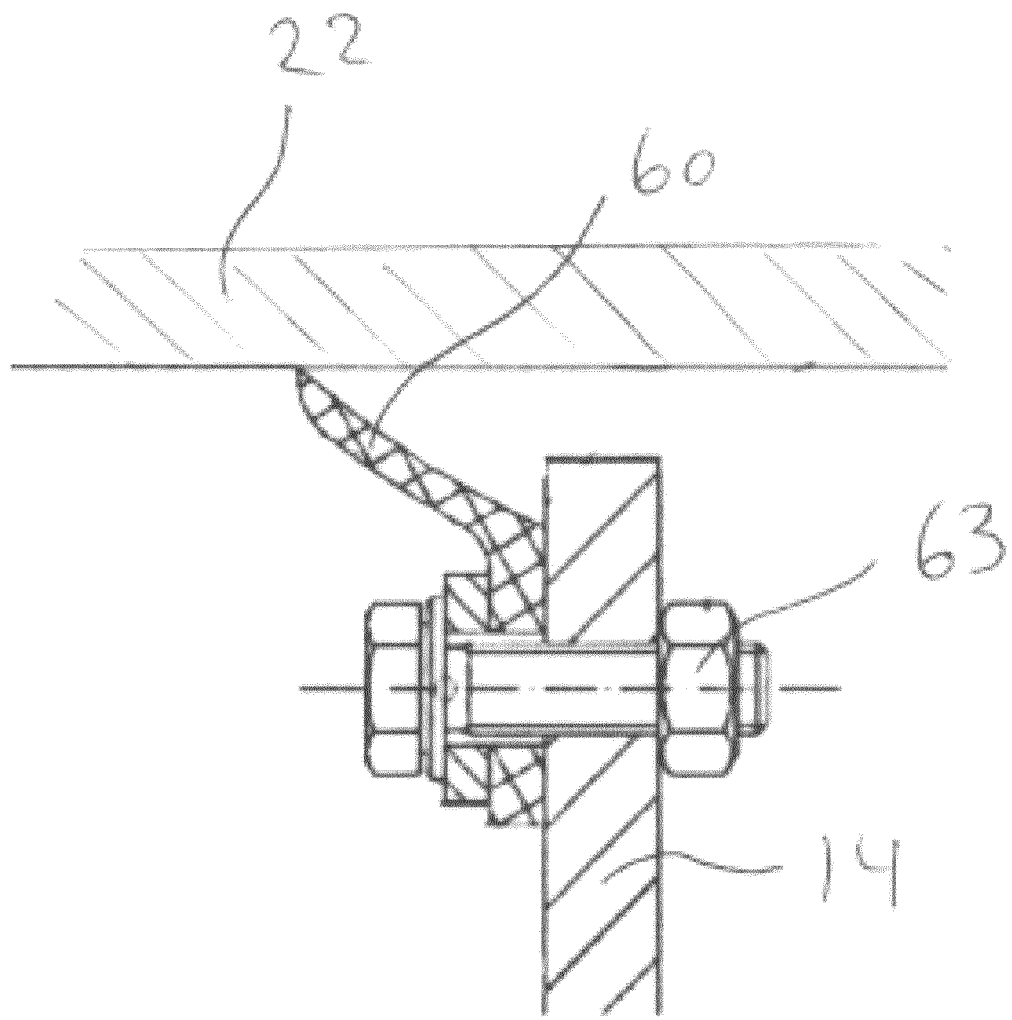
Figure 5:
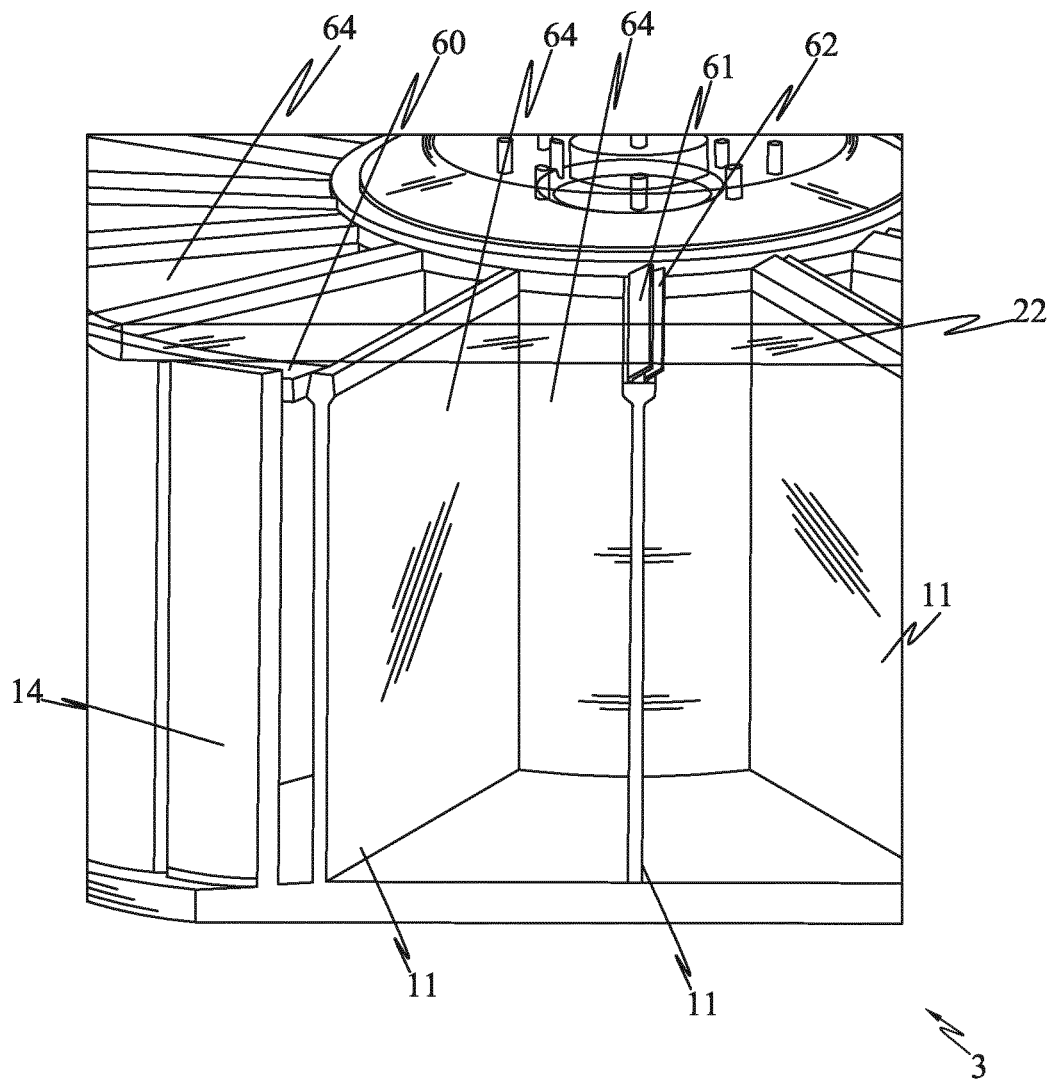
Figure 6:
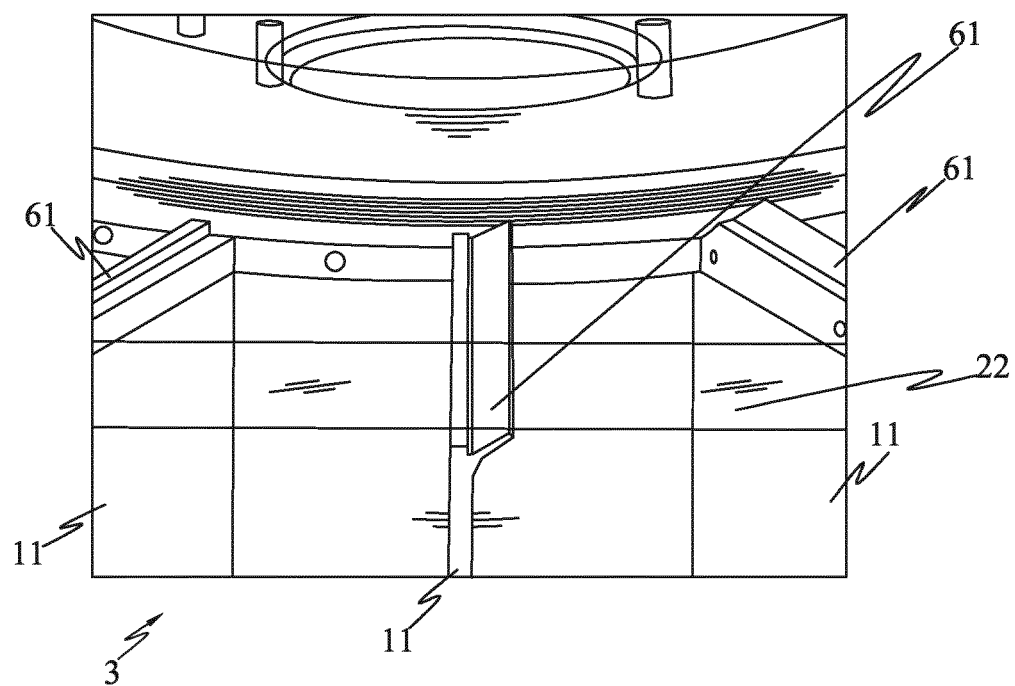
Figure 7:
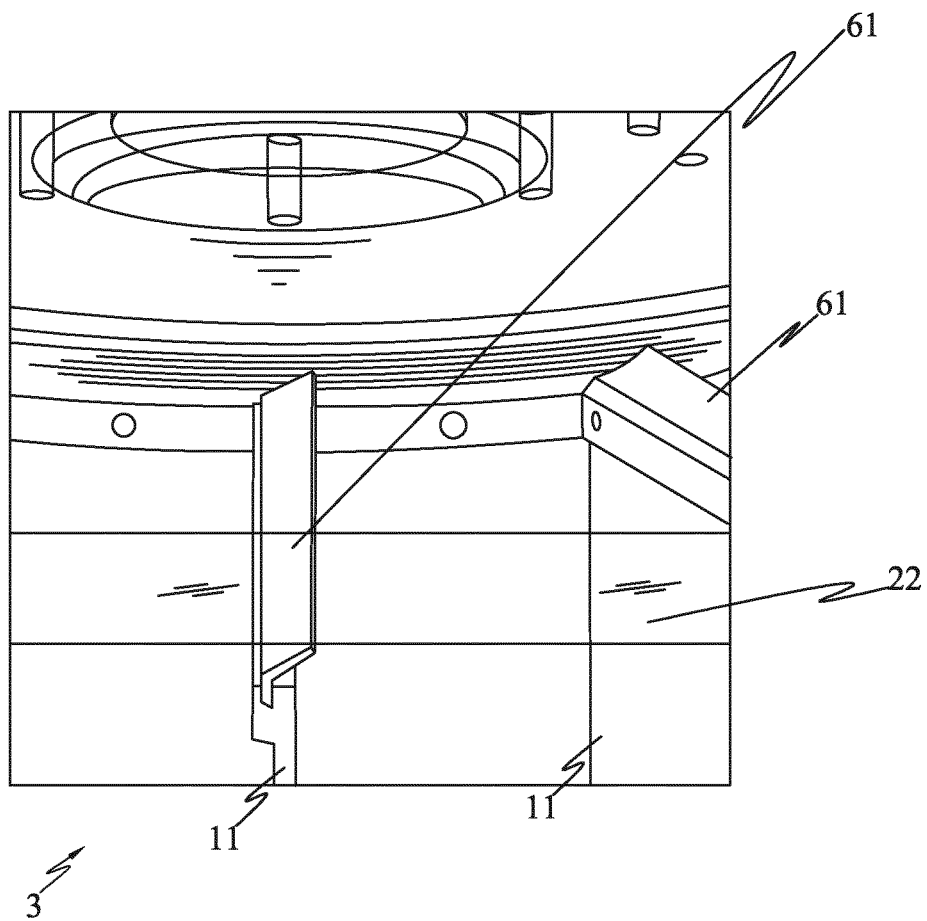

Further advantageous developments are the subject matter of the sub-claims. Below, an exemplified embodiment will be explained in more detail and described on the basis of the drawing, wherein:

FIG. 1 is a lateral front view of a dosing device;
FIG. 2 is a first side view rotated 90° of the dosing device;
FIG. 3 is a second side view rotated 90° of the dosing device;
FIG. 4 is a cross-sectional view of the rotor;
FIG. 5 is a perspective view of the rotor;
FIG. 6 is a magnified perspective view of the rotor;
FIG. 7 is a magnified perspective view of the rotor.

FIGS. 1, 2 and 3 show a dosing device 1 from different angles essentially comprising a dosing rotor 3 rotating in a housing 4 which is totally closed except of a charging opening 5 and an emptying opening 7. In this case, the charging opening 5 and the emptying opening 7 are arranged to each other to form the longest possible measuring section. The housing 4 is swivel-mounted in a framework 2, as specified below. Two pivot bearings 18 are provided to form a pivot axis, about which the housing 4 may pivot when loaded with material. Seen from above, this pivot axis a extends through the centre of the top charging opening 5 and the bottom emptying opening 7 to eliminate effects of errors caused by goods supply and exhaustion, respectively.

A driving means 9 is provided to drive the rotor 3 of the dosing device 1, said driving means 9 here, for example, being constituted by an electric motor not referred to in more detail, and a bevel gear, the exit of which opens to a vertical shaft 25 (cf. FIG. 3) driving the rotor 3. In this case, the driving means 9 is directly mounted to the housing 4, such that it is adapted to follow any rotating motions about the aforesaid pivot axis 8. During the rotating motion about the pivot axis 8, such as caused by the material supply and feeding along the measuring section 2, the housing 4 supports on a force measuring device 10 stationary arranged in the framework 2 and connected, for example, to the housing 4 via a tie rod.

Different kinds of load cells may be used to represent the force-measuring device 10, however, direct-operating sensors are used, such as strain gauges, shearing force sensors, or the like. In doing so, the respective mass of the material flow being conveyed along the measuring section is detected, and the product of instantaneous load by conveying speed is detected to determine the flow rate. The rotational speed of the driving means 9 and thus of the rotor 3 is readjusted by means of a control device known per se and not shown in more detail, to modify the flow rate or to set a specified quantity.

As is apparent from FIG. 5, radially extending entrainment ribs 11 of the rotor 3 take the height up to the inner height of the housing 4. For feeding, a pipe 12 is passed through the upper housing wall 22 of the housing 4. The radially arranged entrainment ribs 11 of the rotor 3 are connected to each other by a peripheral ring 14, which results in a high stability of the rotor 3. Furthermore, it is an effect of the peripheral ring 14 extended almost up to the upper housing wall 22 to prevent the bulk material fed through the charging opening 5 in the hopper 12 from drifting outwardly.

As previously mentioned, FIG. 3 shows a side elevation of the dosing device 1, wherein in particular the path of the pivot axis 8 formed by the pivot bearings 18 may be seen. Additionally, the structure of the housing 4 Is illustrated, having a housing casing, an upper housing wall 22, and a lower housing wall 24 connected to the upper housing wall 22, e.g. by means of screw connections 21. The force measuring device 10 shown In FIG. 1 is arranged at the circumference of the housing 4 to achieve the largest possible effective lever length, however, it may also be mounted still further from or closer toward the pivot axis 8.

In FIG. 4 an enlarged view of the rotor 3 demonstrates the arrangement of a sealing lip 60 on the peripheral ring 14 engaging the upper housing wall 22. The lip 60 may be attached to the ring 14 by means of standard bolt and nut attachments 63. It is important that the lip 60 is arranged in an angle towards the centre of the rotor 3, such that pressure from the material inside the rotor 3 helps increasing the sealing pressure between the lip 60 and the upper housing wall 22. Arranging the lip 60 in an angle away from the centre would allow pressure from the material to deflect the lip away from the upper housing wall 22 and allow material to escape past the lip. Providing an L-shaped lip 60 and directing one leg of the L-shape towards the centre of the rotor 3 and fixing one leg of the L-shape on the peripheral ring 14 effectively provides increased sealing effect.

In FIG. 5 a perspective view of the rotor demonstrates an embodiment of the invention wherein a number of rib sealing lips 61 are arranged on the ribs 11. By arranging a further set of lips on the ribs 11, the capacity and efficiency of the dosing device may be even further increased to the maximum possible dosing volume by reaching the upper housing wall 22 and preventing material from flowing past the ribs between neighbouring chambers. To increase the sealing effect between neighbouring chambers an additional rib sealing lip 62 may be arranged next the rib sealing lips 61 in a double lip arrangement as shown in FIG. 5.

In some embodiments, there can be a number of rib sealing lips 61 arranged on the ribs 11 and the dosing device does not contain a peripheral ring 14 or peripheral sealing lips 60. The rib sealing lips 61 may be attached to the ribs 11 by means of standard bolt and notch nut attachments 63. The sealing lip 61 may be arranged on the rib 11 in an angle from the rib 11 and opposite the direction of rotation of the rotor 3. Providing an L-shaped lip 61 and directing one leg of the L-shape towards the centre of the rotor 3 and fixing one leg of the L-shape on the ribs 11 effectively provides increased sealing effect. As shown in FIGS. 6 and 7, the rib sealing lip 61, may be arranged on either side of the rib 11.

The dosing device of the invention may also comprise one or more additional peripheral sealing lips for improved sealing such that an outer peripheral volume of the inside of the housing is even better sealed from a central volume of the housing.

The invention claimed is:

1. A dosing device (1) for the continuous, gravimetric dosing of pourable material particularly raw meal for cement production, wherein a flow of material is conveyed from a charging opening to an emptying opening in a housing with a rotor (3) which is driven about a vertical rotation axis, while determining the instantaneous load over a measuring section, and with a force measuring device which detects the instantaneous load of the flow of material guided via the rotor (3) comprising a plurality of ribs (11) and a peripheral ring (14); said ribs being attached to the peripheral ring, and said ribs (11) defining a number of chambers inside the peripheral ring for carrying material during operation; wherein a peripheral sealing lip (60) is arranged on the peripheral ring (14) and engages an upper housing wall (22) such that an outer peripheral volume of the inside of the housing is sealed from a central volume of the housing, and wherein the peripheral sealing lip (60) is arranged on the peripheral ring (14) in an angle from the outer ring and towards the central part of the rotor (3) such that material inside the rotor during operation applies a sealing pressure to the peripheral sealing lip (60) by pressing the peripheral sealing lip (60) against the upper housing wall (22) above the rotor (3).

2. The dosing device of claim 1, wherein the peripheral sealing lip (60) has an L-shaped cross-section.

3. The dosing device of claim 1, wherein the peripheral sealing lip (60) is elastic.

4. The dosing device of claim 1, wherein at least one rib sealing lip (61) is arranged on one or more of the ribs (11) for preventing material from flowing past the ribs (11) between neighbouring chambers (64).

5. The dosing device of claim 4, wherein the at least one rib sealing lip (61) is arranged on a first one of the ribs (11) in an angle from the first one of the ribs (11) and opposite the direction of rotation of the rotor (3).

6. The dosing device of claim 4, wherein the at least one rib sealing lip (61) has an L-shaped cross-section.

7. The dosing device of claim 4, wherein the at least one rib sealing lip (61) is elastic.

8. The dosing device of claim 1, wherein at least one additional rib sealing lip (62) is arranged on one or more of the ribs (11) for preventing material from flowing past the ribs (11) between neighbouring chambers (64).

9. The dosing device of claim 8, wherein the at least one additional rib sealing lip (62) is arranged on the rib (11) in an angle from the rib (11) and opposite the direction of rotation of the rotor (3).

* * * * *